United States Patent
Aoyama et al.

(10) Patent No.: US 10,256,046 B2
(45) Date of Patent: Apr. 9, 2019

(54) SOLID ELECTROLYTIC CAPACITOR AND METHOD FOR MAKING THE SAME

(71) Applicant: ROHM CO., LTD., Kyoto-shi, Kyoto (JP)

(72) Inventors: Makoto Aoyama, Kyoto (JP); Hideki Ando, Kyoto (JP)

(73) Assignee: ROHM CO., LTD., Kyoto (JP)

(*) Notice: Subject to any disclaimer, the term of this patent is extended or adjusted under 35 U.S.C. 154(b) by 0 days.

(21) Appl. No.: 15/458,600

(22) Filed: Mar. 14, 2017

(65) Prior Publication Data
US 2017/0271087 A1    Sep. 21, 2017

(30) Foreign Application Priority Data
Mar. 16, 2016 (JP) .................................. 2016-052308

(51) Int. Cl.
| H01G 9/012 | (2006.01) |
| H01G 9/10 | (2006.01) |
| H01G 9/00 | (2006.01) |
| H01G 9/042 | (2006.01) |
| H01G 9/052 | (2006.01) |
| H01G 9/15 | (2006.01) |

(52) U.S. Cl.
CPC .............. *H01G 9/10* (2013.01); *H01G 9/0029* (2013.01); *H01G 9/012* (2013.01); *H01G 9/042* (2013.01); *H01G 9/0425* (2013.01); *H01G 9/052* (2013.01); *H01G 9/15* (2013.01)

(58) Field of Classification Search
CPC ............ H01G 9/08; H01G 9/20; H01G 9/028; H01G 9/42; H01G 9/15; H01G 9/012; H01G 9/052; H01G 9/0425
See application file for complete search history.

(56) References Cited

U.S. PATENT DOCUMENTS

| 6,236,561 | B1 * | 5/2001 | Ogino | .................... | H01G 9/012 |
| | | | | | 361/301.3 |
| 7,449,032 | B2 * | 11/2008 | Vaisman | ................ | H01G 2/065 |
| | | | | | 257/E27.071 |
| 2005/0105248 | A1 * | 5/2005 | Oh | ......................... | H01G 2/065 |
| | | | | | 361/523 |
| 2008/0019081 | A1 * | 1/2008 | Kim | ......................... | H01G 2/06 |
| | | | | | 361/535 |

(Continued)

FOREIGN PATENT DOCUMENTS

JP      2013-105925 A      5/2013

*Primary Examiner* — Nguyen T Ha
(74) *Attorney, Agent, or Firm* — Hamre, Schumann, Mueller & Larson, P.C.

(57) ABSTRACT

A solid electrolytic capacitor includes a capacitor element, an anode terminal, a cathode terminal, and a sealing resin covering the capacitor element. The anode terminal includes a support portion for supporting the capacitor element, and an anode standing portion formed upright relative to the support portion. The capacitor element includes an anode wire projecting from a porous sintered body. The anode wire is placed on the upper end face of the anode standing portion. The anode wire and the anode standing portion have parts that are exposed from the sealing resin and covered by an electrically conductive anode terminal covering layer for ensuring electrical connection between the anode wire and the anode terminal.

28 Claims, 8 Drawing Sheets

(56) References Cited

U.S. PATENT DOCUMENTS

| | | | |
|---|---|---|---|
| 2009/0059478 A1* | 3/2009 | Umemoto | H01G 9/08 |
| | | | 361/535 |
| 2010/0226072 A1* | 9/2010 | Kim | H01G 9/012 |
| | | | 361/538 |
| 2010/0232091 A1* | 9/2010 | Kaneda | C23C 14/08 |
| | | | 361/528 |
| 2010/0246099 A1* | 9/2010 | Naka | H01G 2/14 |
| | | | 361/534 |
| 2011/0261503 A1* | 10/2011 | Aoyama | H01G 9/0029 |
| | | | 361/524 |

* cited by examiner

SOLID ELECTROLYTIC CAPACITOR AND METHOD FOR MAKING THE SAME

FIELD

The present disclosure generally relates to a solid electrolytic capacitor, and in particular to a solid electrolytic capacitor of a resin package type configured for surface-mounting. The present disclosure also relates to a method for making such a solid electrolytic capacitor.

BACKGROUND

Due to the recent trend toward size reduction and higher functionality, electronic devices are required to operate in a higher frequency range. To this end, the role of capacitors used in the electronic circuits is becoming more important in terms of noise reduction and the smoothing of the power voltage. Under these circumstances, there is an increasing demand for compact solid electrolytic capacitors having a large capacitance, excellent frequency characteristics and a low impedance.

As known in the art, a conventional solid electrolytic capacitor may include a porous sintered body made of a vale metal, and an anode wire protruding from the sintered body. The anode wire is connected to an anode terminal by welding, for example. To downsize such a solid electrolytic capacitor, use may be made of a shorter anode wire. However, as the protruding part of the wire becomes shorter, the welding portion (to the anode terminal) comes closer to the sintered body. As a result, the inner part of the sintered body may be affected by the welding heat conducted along the anode wire, which may unduly lead to an increase of leakage current in the capacitor element.

SUMMARY

In light of the above circumstances, the present disclosure describes a solid electrolytic capacitor that realizes size reduction and is capable of suppressing leakage current increase of the capacitor element due to thermal effect involved in welding the anode wire to another conductor. The present disclosure also describes a method for making such a solid electrolytic capacitor.

According to a first aspect of the present disclosure, there is provided a solid electrolytic capacitor made up of: a capacitor element including a porous sintered body made of a valve metal, an anode wire partially inserted in the porous sintered body, a dielectric layer covering the porous sintered body, and a cathode portion covering the dielectric layer; an anode terminal including an anode support portion supporting the capacitor element, and an anode standing portion standing on the anode support portion in a thickness direction of the capacitor element, where the anode wire is disposed on the anode standing portion; a cathode terminal including a cathode support portion supporting the capacitor element; a sealing resin covering the capacitor element; and an electrically conductive anode terminal covering layer. The anode terminal and the cathode terminal are made from a single electrically conductive base member. Each of the anode wire, the anode support portion, the anode standing portion and the cathode support portion includes an exposed part exposed from the sealing resin. The anode terminal covering layer is in contact with both the exposed part of the anode wire and the exposed part of the anode standing portion.

According to a second aspect of the present disclosure, there is provided a method for making a solid electrolytic capacitor. The method includes: forming a first recess and a second recess in a base member obverse surface of an electrically conductive base member; dividing the first recess into a first region and a second region by removing a part of the base member; placing a capacitor element to span the first region and the second region, where the capacitor element includes a porous sintered body made of a valve metal, an anode wire partially inserted in the porous sintered body, a dielectric layer covering the porous sintered body, and a cathode portion covering the dielectric layer; forming a sealing resin covering the capacitor element; cutting the base member along a first line and a second line that flank the porous sintered body to obtain a piece of the base member, where the first line is disposed between the first recess and the second recess; and forming an electrically conductive covering member held in contact with an exposed part of the piece of the base member and with an exposed part of the anode wire. The placing of the capacitor element includes fixing the anode wire to a part of the base member obverse surface that is opposite to the first recess with respect to the second recess.

Further features and advantages of the capacitor and the method relating to the present disclosure will become apparent from the following detailed description with reference to the attached drawings.

DESCRIPTION OF THE PREFERRED EMBODIMENTS

Figure 1:
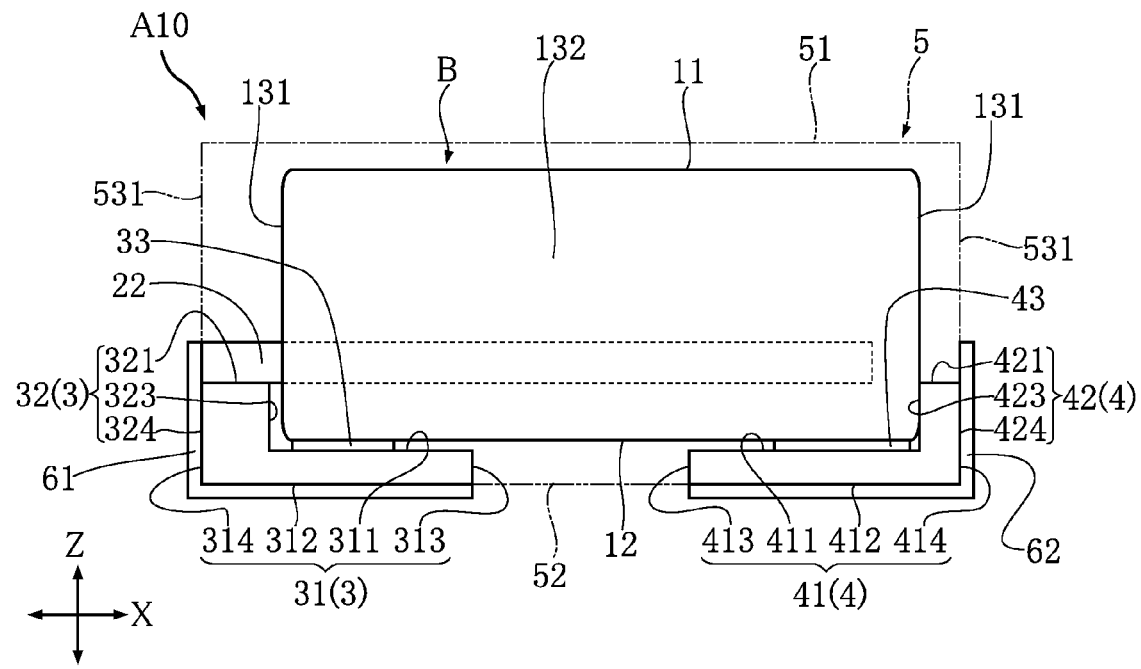
FIG. 1 is a right side view of a solid electrolytic capacitor in accordance with the present disclosure.

Modes for implementing the present disclosure (hereinafter referred to as "embodiments") are described below with reference to the accompanying drawings.

A solid electrolytic capacitor A10 in accordance with an embodiment is described with reference to FIGS. 1-6. The solid electrolytic capacitor A10 includes a capacitor element B, an anode terminal 3, an anode bonding layer 33, a cathode terminal 4, a cathode bonding layer 43, a sealing resin 5, an anode terminal covering layer 61, and a cathode terminal covering layer 62.

Figure 2:
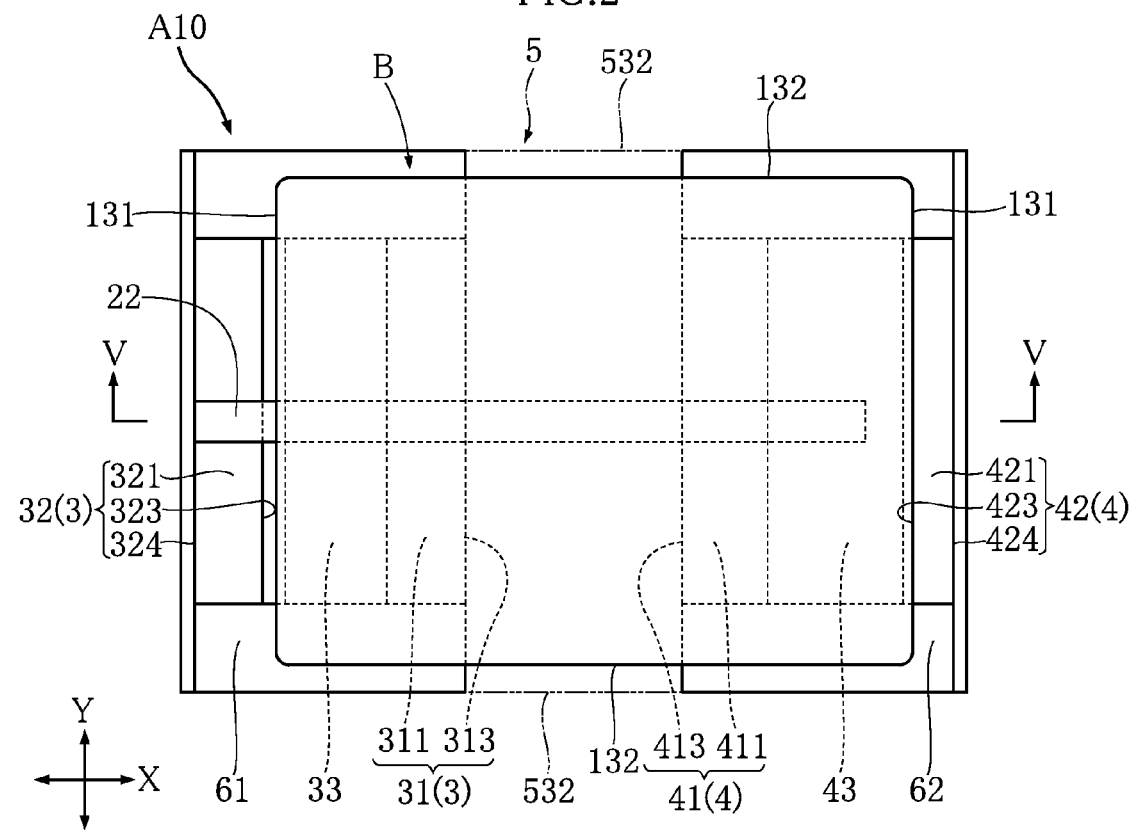
FIG. 2 is a plan view of the solid electrolytic capacitor shown in FIG. 1.
Figure 3:
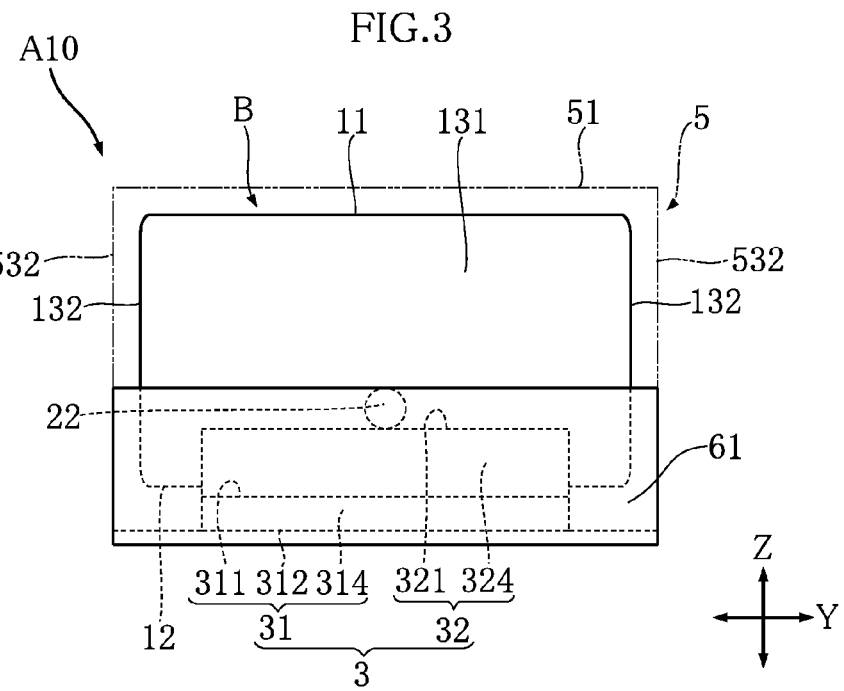
FIG. 3 is a front view of the solid electrolytic capacitor shown in FIG. 1.
Figure 4:
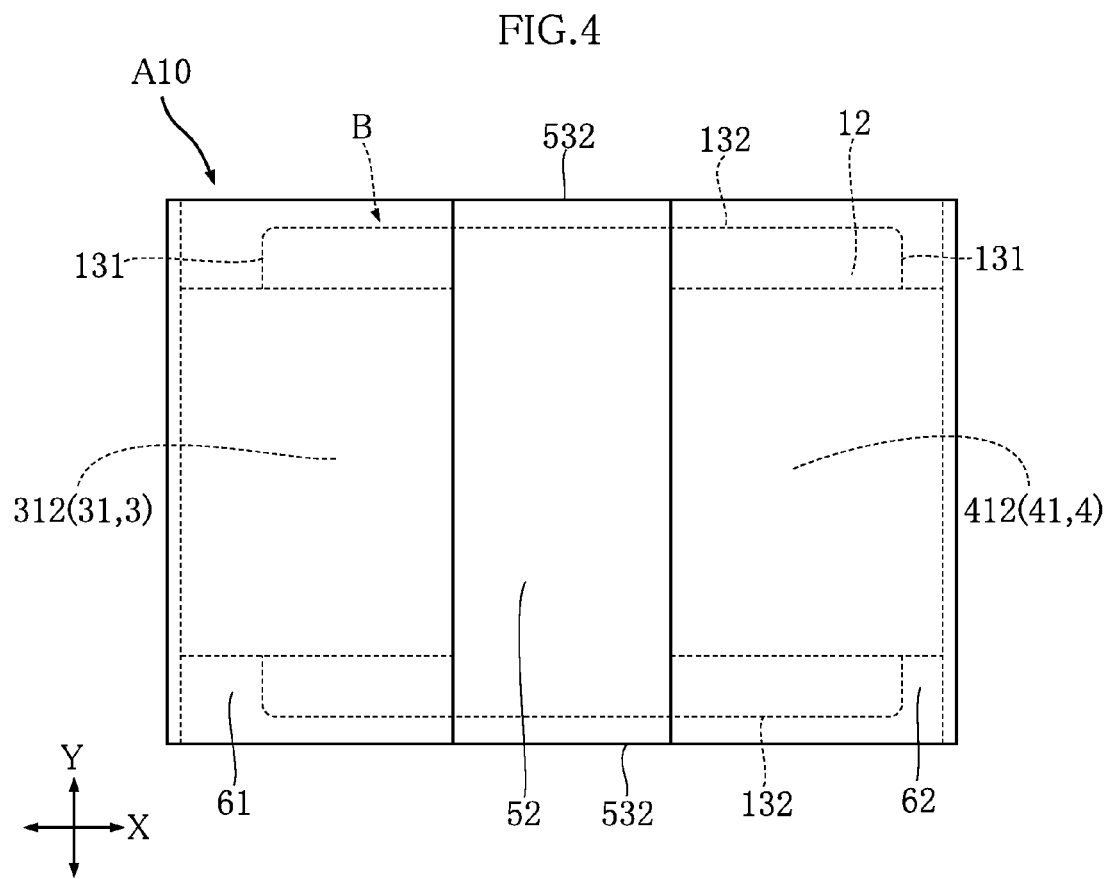
FIG. 4 is a bottom view of the solid electrolytic capacitor shown in FIG. 1.
Figure 5:
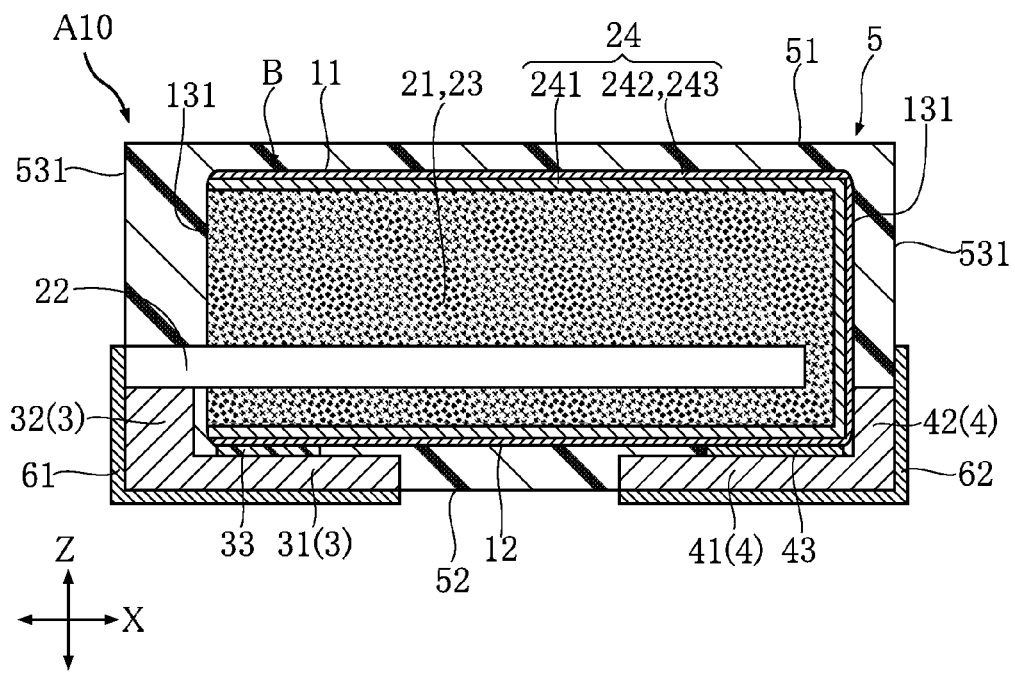
FIG. 5 is a sectional view taken along line V-V in FIG. 2.
Figure 6:
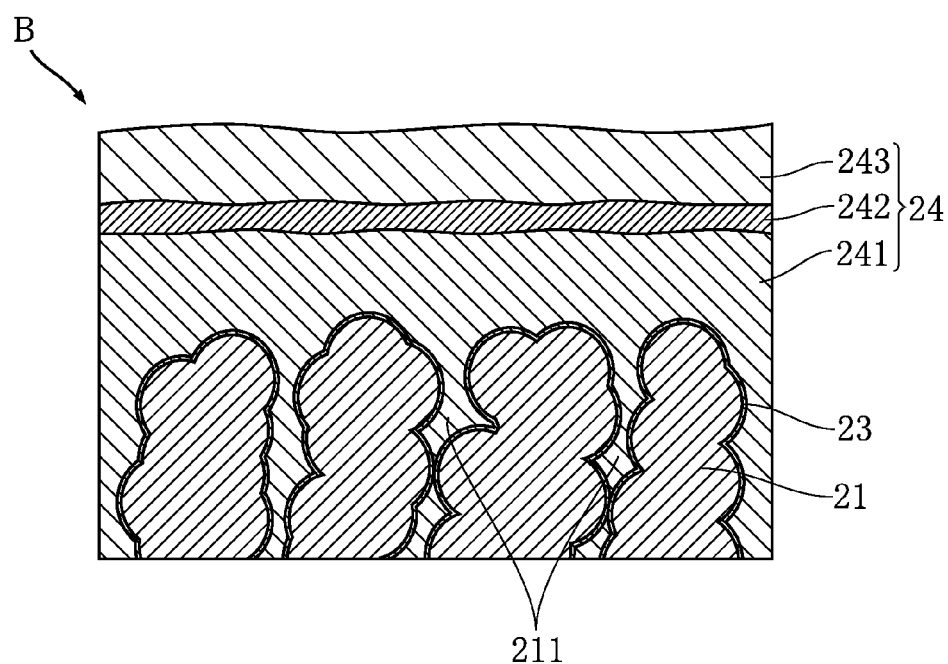
FIG. 6 is an enlarged sectional view illustrating a part of a capacitor element of the solid electrolytic capacitor shown in FIG. 1.

FIG. 1 is a right side view of the solid electrolytic capacitor A10. FIG. 2 is a plan view of the solid electrolytic capacitor A10. FIG. 3 is a front view of the solid electrolytic capacitor A10. FIG. 4 is a bottom view of the solid electrolytic capacitor A10. FIG. 5 is a sectional view taken along line V-V in FIG. 2. FIG. 6 is an enlarged sectional view illustrating a part of the capacitor element B of the solid electrolytic capacitor A10. Note that the sealing resin 6 is depicted by phantom lines (double-dashed lines) in FIGS. 1 and 3. In FIG. 2, the illustration of the sealing resin 6 is omitted for the convenience of understanding.

The solid electrolytic capacitor A10 shown in these figures is of a resin package type for surface-mounting on various circuit boards. Herein, for convenience of explanation, the longitudinal direction of the capacitor element B (i.e., the horizontal direction in FIG. 1), which is perpendicular to the thickness direction Z is defined as the first direction X, whereas the widthwise direction of the capacitor element B (i.e., the vertical direction in FIG. 2), which is perpendicular to both of the thickness direction Z and the first direction X is defined as the second direction Y. The solid electrolytic capacitor A10 is rectangular as viewed in the thickness direction Z of the solid electrolytic capacitor B (hereinafter referred to as "as viewed in plan").

The structure of the capacitor element B is described below. As shown in FIGS. 1-4, the capacitor element B has an element obverse surface 11, an element bottom surface 12, a pair of element first side surfaces 131 and a pair of element second side surfaces 132. As shown in FIG. 5, the capacitor element B includes a porous sintered body 21, an anode wire 22, a dielectric layer 23 and a cathode portion 24. The capacitor element B excluding the anode wire 22 is in the form of a rectangular parallelepiped.

As shown in FIGS. 1-3, the element obverse surface 11 faces upward in the thickness direction Z, whereas the element bottom surface 12 faces downward in the thickness direction Z. The element obverse surface 11 and the element bottom surface 12 are spaced apart from each other. The element obverse surface 11 and the element bottom surface 12 are approximately the same in area. The paired element first side surfaces 131 are positioned between the element obverse surface 11 and the element bottom surface 12 and spaced apart from each other in the first direction X. The anode wire 22 is rod shaped and projects in the first direction X from one of the element first side surfaces 131 (the left side surface in FIG. 1). The paired element second side surfaces 132 are positioned between the element obverse surface 11 and the element bottom surface 12 and spaced apart from each other in the second direction Y. The areas of the element second side surfaces 132 are smaller than those of the element first side surfaces 131.

As shown in FIG. 1, the projecting end of the anode wire 22 is electrically connected to the anode terminal 3. The element bottom surface 12 of the capacitor element B is electrically connected to the cathode terminal 4.

As shown in FIG. 5, the porous sintered body 21 covers a part of the anode wire 22. The porous sintered body 21 is covered with the dielectric layer 23 and the cathode portion 24, and constitutes, along with the anode wire 22, an anode of the capacitor element B. The porous sintered body 21 has a uniform thickness that is considerably larger than the thicknesses of the dielectric layer 23 and the cathode portion 24. Thus, the shape of the capacitor element B excluding the anode wire 22 conforms to the shape of the porous sintered body 21. As shown in FIGS. 1-4, since the porous sintered body 21 is in the form of a rectangular parallelepiped, the capacitor element B is also in the form of a rectangular parallelepiped. The porous sintered body 21 is made of a valve metal such as Ta or Nb. As shown in FIG. 6, the surface of the porous sintered body 21 is formed with a large number of pores 211, which increases the surface area of the porous sintered body 21.

As shown in FIG. 5, the anode wire 22 is in the form of a rod having a circular cross section and partially inserted in the porous sintered body 21. In this embodiment, the anode wire 22 is offset from the center of the porous sintered body 21 in the thickness direction Z toward an anode support portion 31 of the anode terminal 3 and a cathode support portion 41 of the cathode terminal 4, or toward the element bottom surface 12. The anode wire 22 is made of the same metal valve as that making the porous sintered body 21, which is Ta or Nb in this embodiment.

As shown in FIGS. 5 and 6, the dielectric layer 23 covers the porous sintered body 21. The dielectric layer 23 is formed by oxidizing the surface of the porous sintered body 21. Accordingly, the dielectric layer 23 is an oxide of a valve metal and specifically $Ta_2O_5$ or $Nb_2O_5$ in this embodiment.

As shown in FIGS. 5 and 6, the cathode portion 24 includes a solid electrolyte layer 241, a first cathode layer 242 and a second cathode layer 243 that are laminated. The cathode portion 24 covers the dielectric layer 23 and constitutes a cathode of the capacitor element B. The solid electrolyte layer 241 covers the dielectric layer 23 while filling the pores 211 of the porous sintered body 21. The solid electrolyte layer 241 is made of $MnO_2$ or a conductive polymer, for example. When the solid electrolytic capacitor A10 is in operation, electric charge is accumulated at the interface between the dielectric layer 23 and the solid electrolyte layer 241. The first cathode layer 242 covers the solid electrolyte layer 241 and is electrically connected to the solid electrolyte layer 241. The first cathode layer 242 is made of graphite, for example. The second cathode layer 243 covers the first cathode layer 242 and is electrically connected to the solid electrolyte layer 241 via the first cathode layer 242. The second cathode layer 243 is exposed at the surface of the capacitor element B. In this embodiment, the second cathode layer 243 is made of Ag.

Described below are the structures of the structural elements of the solid electrolytic capacitor A10 other than the capacitor element B, which are the anode terminal 3, the anode bonding layer 33, the cathode terminal 4, the cathode bonding layer 43, the sealing resin 5, the anode terminal covering layer 61 and the cathode terminal covering layer 62.

The anode terminal 3 is electrically conductive and connected to the anode wire 22 as shown in FIGS. 1-5 to thereby constitute an anode of the solid electrolytic capacitor A10. The anode terminal 3 is made from an electrically conductive base member 82, which will be described later in explaining a method for making the solid electrolytic capacitor A10. In this embodiment, the electrically conductive base member 82 is made of an alloy containing Fe and Ni (often called "42 alloy") or an alloy containing Cu. The anode terminal 3 includes an anode support portion 31 and an anode standing portion 32. In this embodiment, the anode terminal 3 is exposed at one of paired first resin side surfaces 531 (the left side surface in FIG. 1) of the sealing resin 5, which will be described later, but not exposed at a pair of second resin side surfaces 532. However, the anode terminal 3 may be exposed at the paired second resin side surfaces 532 as well.

As shown in FIGS. 1-5, the anode support portion 31 supports the capacitor element B. The anode support portion 31 is rectangular as viewed in plan. The anode support portion 31 has a support surface 311, a reverse surface 312, an inner surface 313 and an outer surface 314. The support surface 311 is the upper surface of the anode support portion 31 in FIG. 1 and supports the capacitor element B. The reverse surface 312 is the lower surface of the anode support portion 31 in FIG. 1 and faces away from the support surface 311 in the thickness direction Z. The inner surface 313 faces the cathode terminal 4 and is one of the two surfaces that are perpendicular to the support surface 311 and the reverse surface 312 and spaced apart from each other in the first direction X. The other surface is the outer surface 314 that faces outward of the solid electrolytic capacitor A10. In this embodiment, the support surface 311 and the inner surface 313 are covered with the sealing resin 5, whereas the reverse surface 312 and the outer surface 314 are exposed from the sealing resin 5.

As shown in FIGS. 1-3 and 5, the anode standing portion 32 stands on the support surface 311 of the anode support portion 31 in the thickness direction Z, and the anode wire 22 is disposed on the anode standing portion 32. The anode standing portion 32 is in the form of a rectangular parallelepiped. The anode standing portion 32 has a top surface 321, an inner surface 323 and an outer surface 324. The top surface 321 is the upper surface of the anode standing portion 32 in FIG. 1 and the anode wire 22 is disposed on the top surface 321. In this embodiment, the anode wire 22 is in contact with the top surface 321. Alternatively, the anode wire 22 may not be in contact with the top surface 321, and a gap may be defined between the anode wire 22 and the top surface 321. The inner surface 323 faces the capacitor element B and is one of the two surfaces that are perpendicular to the top surface 321 and the support surface 311 and spaced apart from each other in the first direction X. The other surface is the outer surface 324 that faces outward of the solid electrolytic capacitor A10. In this embodiment, the top surface 321 and the inner surface 323 are covered with the sealing resin 5, whereas the outer surface 324 exposed from the sealing resin 5. The outer surface 324 is flush with the outer surface 314 of the outer surface 314 of the anode support portion 31.

The anode bonding layer 33 is an electrically insulating member that is in contact with both of the support surface 311 of the anode support portion 31 and the cathode portion 24 (the element bottom surface 12 of the capacitor element B) as shown in FIGS. 1 and 5. The anode bonding layer 33 bonds the capacitor element B to the anode support portion 31. In this embodiment, the anode bonding layer 33 is made of polyimide. The anode bonding layer 33 may be made of a material other than polyimide. For example, the anode bonding layer 33 may be made of an epoxy resin.

The cathode terminal 4 is electrically conductive and connected to the cathode portion 24 as shown in FIGS. 1, 2, 4 and 5 to thereby constitute a cathode of the solid electrolytic capacitor A10. The cathode terminal 4 and the anode terminal 3 may be made from the same electrically conductive material. In this embodiment, the anode terminal 3 and the cathode terminal 4 are made from the single electrically conductive base member 82. The cathode terminal 4 includes a cathode support portion 41 and a cathode standing portion 42. In this embodiment, the cathode terminal 4 is exposed at the other one of paired first resin side surfaces 531 (the right side surface in FIG. 1) of the sealing resin 5, which will be described later, but not exposed at a pair of second resin side surfaces 532. However, the cathode terminal 4 may be exposed at the paired resin second side surfaces 532 as well.

As shown in FIGS. 1, 2, 4 and 5, the cathode support portion 41 supports the capacitor element B, along with the anode support portion 31. The cathode support portion 41 is rectangular as viewed in plan. The cathode support portion 41 has a support surface 411, a reverse surface 412, an inner surface 413 and an outer surface 414. The support surface 411 is the upper surface of the cathode support portion 41 in FIG. 1 and supports the capacitor element B. The reverse surface 412 is the lower surface of the cathode support portion 41 in FIG. 1 and faces away from the support surface 411 in the thickness direction Z. The inner surface 413 faces the anode terminal 3 and is one of the two surfaces that are perpendicular to both of the support surface 411 and the reverse surface 412 and spaced apart from each other in the first direction X. The other surface is the outer surface 414 that faces outward of the solid electrolytic capacitor A10. In this embodiment, the support surface 411 and the inner surface 413 are covered with the sealing resin 5, whereas the reverse surface 412 and the outer surface 414 are exposed from the sealing resin 5.

As shown in FIGS. 1, 2 and 5, the cathode standing portion 42 stands on the support surface 411 of the cathode support portion 41 in the thickness direction Z. The cathode standing portion 42 and the anode standing portion 32 are equal in height. The cathode standing portion 42 is in the form of a rectangular parallelepiped. The cathode standing portion 42 has a top surface 421, an inner surface 423 and an outer surface 424. The top surface 421 is the upper surface of the cathode standing portion 42 in FIG. 1. The inner surface 423 faces the capacitor element B and is one of the two surfaces that are perpendicular to the top surface 421 and the support surface 411 and spaced apart from each other in the first direction X. In this embodiment, a part of the element first side surface 131 of the capacitor element B is in contact with the inner surface 423. Alternatively, the element first side surface 131 may not be in contact with inner surface 423, and a gap may be defined between the element first side surface 131 and the inner surface 423. The outer surface 314 faces outward of the solid electrolytic capacitor A10 and is the other one of the above-described two surfaces. In this embodiment, the top surface 421 and the inner surface 423 are covered with the sealing resin 5, whereas the outer surface 424 is exposed from the sealing resin 5. The outer surface 424 is flush with the outer surface 414 of the cathode support portion 41.

The cathode bonding layer 43 is an electrically conductive member that is in contact with both of the support surface 411 of the cathode support portion 41 and the cathode portion 24 (the element bottom surface 12 of the capacitor element B) as shown in FIGS. 1 and 5. The cathode bonding layer 43 bonds the capacitor element B to the cathode support portion 41 and electrically connects the cathode portion 24 and the cathode terminal 4 to each other. In this embodiment, the cathode bonding layer 43 is made of a synthetic resin mainly composed of an epoxy resin containing Ag ("Ag paste").

The sealing resin 5 is made of a synthetic resin and covers the capacitor element B and a part of each of the anode terminal 3 and the cathode terminal 4. In this embodiment, the sealing resin 5 is made of an epoxy resin containing glass frit. The sealing resin 5 has a resin obverse surface 51, a resin reverse surface 52, a pair of resin first side surfaces 531 and a pair of resin second side surfaces 532. The resin obverse surface 51 is the upper surface of the sealing resin 5 in FIG. 1, whereas the resin reverse surface 52 is the lower surface of the sealing resin 5 in FIG. 1. The resin obverse surface 51 and the resin reverse surface 52 face away from each other in the thickness direction Z. As shown in FIG. 4, the reverse surface 312 of the anode support portion 31 and the reverse surface 412 of the cathode support portion 41 are exposed at the resin reverse surface 52, and the resin reverse surface 52 is flush with the reverse surface 312 and the reverse surface 412. The area of the resin reverse surface 52 is smaller than that of the resin obverse surface 51. As shown in FIGS. 1 and 5, the paired resin first side surfaces 531 are perpendicular to both of the resin obverse surface 51 and the resin reverse surface 52 and spaced apart from each other in the first direction X. The outer surface 314 of the anode support portion 31, the outer surface 324 of the anode standing portion 32 and the anode wire 22 are exposed at one of the paired resin first side surfaces 531 (the left side surface in FIG. 1). This resin first side surface 531 is flush with the outer surface 314, the outer surface 324 and the anode wire 22. The outer surface 414 of the cathode support portion 41 and the outer surface 424 of the cathode standing portion 42 are exposed at the other one of the paired resin first side surfaces 531 (the right side surface in FIG. 1). This resin first side surface 531 is flush with the outer surface 414 and the outer surface 424.

As shown in FIGS. 2-4, the paired resin second side surfaces 532 are perpendicular to both of the resin obverse surface 51 and the resin reverse surface 52 and spaced apart from each other in the second direction Y. In this embodiment, the anode terminal 3 and the cathode terminal 4 are not exposed at the resin second side surfaces 532. In this embodiment, the area of the resin second side surfaces 532 is larger the area of the resin first side surfaces 531.

The anode terminal covering layer 61 is an electrically conductive member that is in contact with the anode wire 22 and the outer surface 324 of the anode standing portion 32, which are exposed from the sealing resin 5 as shown in FIGS. 1-5. In this embodiment, the anode terminal covering layer 61 is in contact with the reverse surface 312 and the outer surface 314 of the anode support portion 31 as well, which are exposed from the sealing resin 5. In this embodiment, the anode terminal covering layer 61 covers a part of the resin reverse surface 52 and a part of one of the resin first side surfaces 531 (the left side surface in FIG. 1) of the sealing resin 5. The anode wire 22 and the anode standing portion 32 are electrically connected to each other via the anode terminal covering layer 61. Thus, even when the anode wire 22 is not in contact with the top surface 321 of the anode standing portion 32, the anode wire 22 and the anode terminal 3 are electrically connected to each other via the anode terminal covering layer 61. The anode terminal covering layer 61 in this embodiment may be made of two mutually laminated layers, i.e., a Ni layer and an alloy layer containing Sn. The cathode terminal covering layer 62 is an electrically conductive member that is in contact with the outer surface 424 of the cathode standing portion 42, which is exposed from the sealing resin 5 as shown in FIGS. 1, 2, 4 and 5. In this embodiment, the cathode terminal covering layer 62 is in contact with the reverse surface 412 and the outer surface 414 of the cathode support portion 41 as well, which are exposed from the sealing resin 5. In this embodiment, the cathode terminal covering layer 62 covers a part of the resin reverse surface 52 and a part of the other one of the resin first side surfaces 531 (the right side surface in FIG. 1) of the sealing resin 5. The cathode terminal covering layer 62 in this embodiment is made of the same metal as that making the anode terminal covering layer 61. Accordingly, similarly to the anode terminal covering layer 61, the cathode terminal covering layer 62 may be made of two mutually laminated layers, i.e., a Ni layer and an alloy layer containing Sn. In this embodiment, the cathode terminal covering layer 62 has the same shape as that of the anode terminal covering layer 61.

A method for making the solid electrolytic capacitor A10 is described below with reference to the sectional views in FIGS. 7-15.

Figure 7:
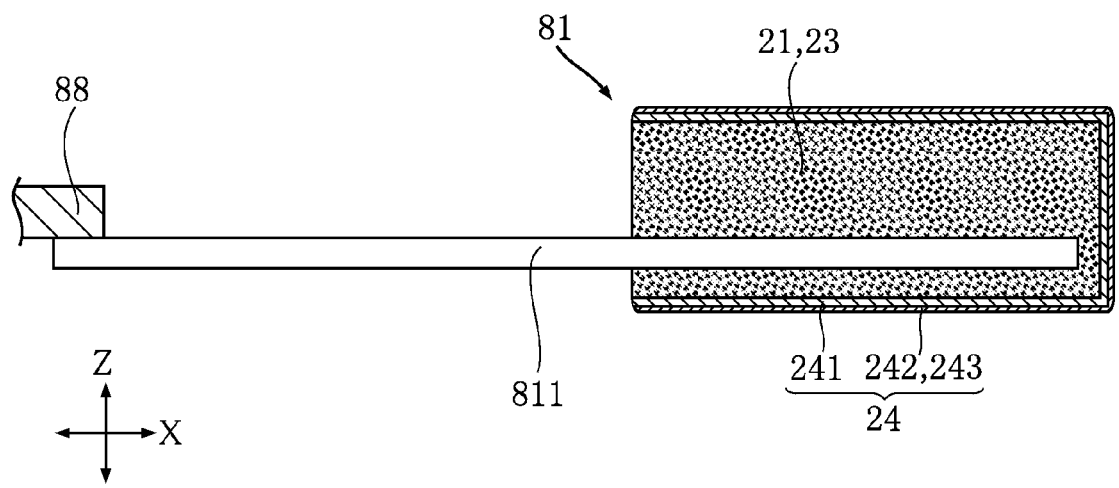
FIG. 7 is a sectional view for describing a method for making the solid electrolytic capacitor shown in FIG. 1.

First, a capacitor element 81 is prepared as shown in FIG. 7. The capacitor element 81 corresponds to the capacitor element B of the solid electrolytic capacitor A10. A porous sintered body 21 for constituting an anode is first formed using a valve metal so as to cover a part of an anode wire 811. Specifically, fine powder of valve metal such as Ta or Nb is loaded into a mold along with an anode wire 811 and compacted, whereby the porous sintered body 21 is formed. It is preferable that the anode wire 811 is made of the same valve metal as that of the porous sintered body 21. The projecting end of the anode wire 811 is then fixed to an elongated support member 88 by welding, for example, such that the porous sintered body 21 is suspended from the support member 88 via the anode wire 811.

A dielectric layer 23 is then formed to cover the porous sintered body 21. Specifically, the porous sintered body 21 is immersed in a chemical treatment solution such as an aqueous solution of phosphoric acid such that the surface of the porous sintered body 21 is oxidized, whereby the dielectric layer 23 is formed.

A cathode portion 24 constituting a cathode is then formed to cover the dielectric layer 23. Specifically, to form the cathode portion 24, a solid electrolyte layer 241 is formed to cover the dielectric layer 23, and then a first cathode layer 242 and a second cathode layer 243 are laminated to cover the solid electrolyte layer 241. The solid electrolyte layer 241 made of $MnO_2$ as described above is obtained by immersing the porous sintered body 21 (covered with the dielectric layer 23) in an aqueous solution of manganese nitrate and then calcining it. The solid electrolyte layer 241 made of a conductive polymer as described above is obtained by immersing the porous sintered body 21 (covered with the dielectric layer 23) in a solution of an oxidizing agent and then in an electrically conductive monomer solution and thereafter drying it for polymerization. The first cathode layer 242 is formed by immersing the porous sintered body 21 (covered with the dielectric layer 23 and the solid electrolyte layer 241) in an aqueous solution of graphite using an organic solvent and then drying or calcining it. The second cathode layer 243 is formed by immersing the porous sintered body 21 (covered with the dielectric layer 23, the solid electrolyte layer 241 and the first cathode layer 242) in an aqueous solution of Ag filler using an organic solvent and then drying or calcining it. The capacitor element 81 is obtained through the above process.

Figure 8:
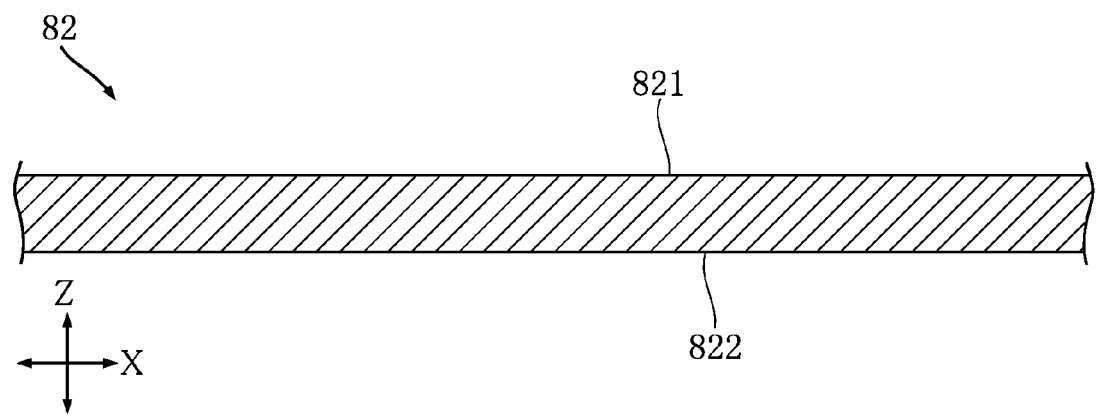
FIG. 8 is a sectional view for describing a method for making the solid electrolytic capacitor shown in FIG. 1.

As shown in FIG. 8, an electrically conductive base member 82 is then prepared that has a base member obverse surface 821 and a base member reverse surface 822 facing away from each other. The anode terminal 3 and the cathode terminal 4 of the solid electrolytic capacitor A10 will be made from the electrically conductive base member 82 as will be described later. As described above, the electrically conductive base member 82 of this embodiment is made of an alloy containing Fe and Ni ("42 alloy") or an alloy containing Cu. The electrically conductive base member 82 may have a thickness of 200 µm, for example.

Figure 9:
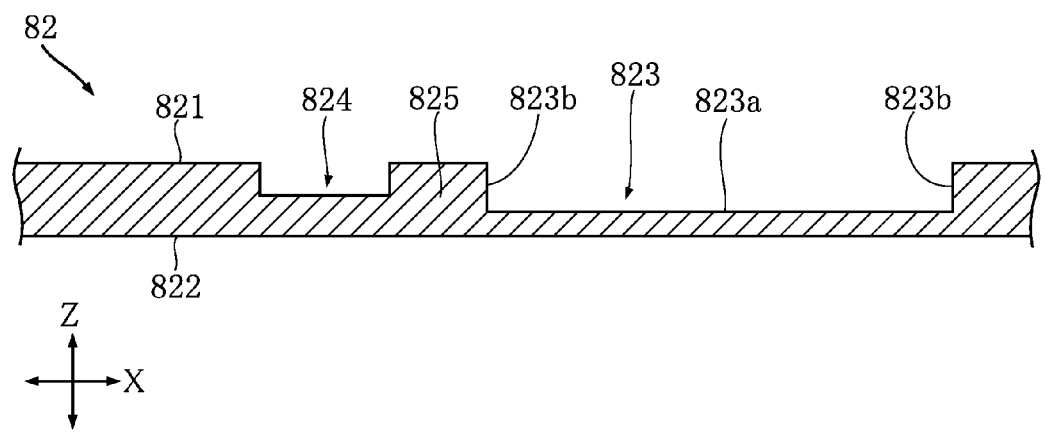
FIG. 9 is a sectional view for describing a method for making the solid electrolytic capacitor shown in FIG. 1.

As shown in FIG. 9, a first recess 823 and a second recess 824 spaced apart from the first recess 823 are then formed in the base member obverse surface 821 of the electrically conductive base member 82. In this embodiment, the length of the first recess 823 in the first direction X is longer than the length of the second recess 824 in the first direction X. In this embodiment, the depth of the first recess 823 is larger than that of the second recess 824. The first recess 823 and the second recess 824 may be formed simultaneously by press working or etching. Herein, the portion of the electrically conductive base member 82 that is positioned between the first recess 823 and the second recess 824 is referred to as an intermediate portion 825. A part of the intermediate portion 825 is to become the anode standing portion 32 of the solid electrolytic capacitor A10. The first recess 823 is formed to have a bottom surface 823a that is parallel to the base member obverse surface 821 and the base member reverse surface 822, and a pair of side surfaces 823b that are perpendicular to both of the base member obverse surface 821 and the bottom surface 823a. The thickness of the electrically conductive base member 82 from the bottom surface 823a to the base member reverse surface 822 is 50-70 µm.

Figure 10:
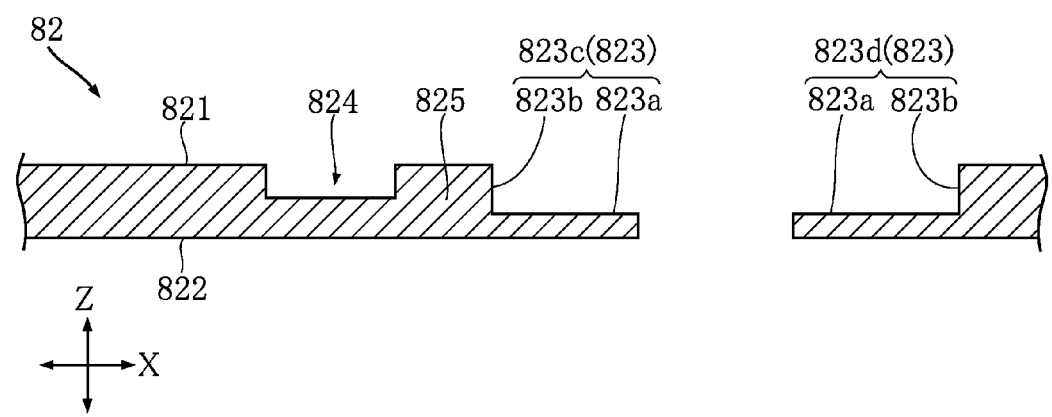
FIG. 10 is a sectional view for describing a method for making the solid electrolytic capacitor shown in FIG. 1.

Then, as shown in FIG. 10, the first recess 823 is divided into two regions spaced apart from each other by removing a part of the base member 82 corresponding in position to the first recess 823. This division may be performed by punching or etching. The first recess 823 is thus divided into a first region 823c connected to the intermediate portion 825 and a second region 823d spaced apart from the first region 823c. The first region 823c becomes the anode terminal 3 of the solid electrolytic capacitor A10, whereas the second region 823d becomes the cathode terminal 4 of the solid electrolytic capacitor A10.

Figure 11:
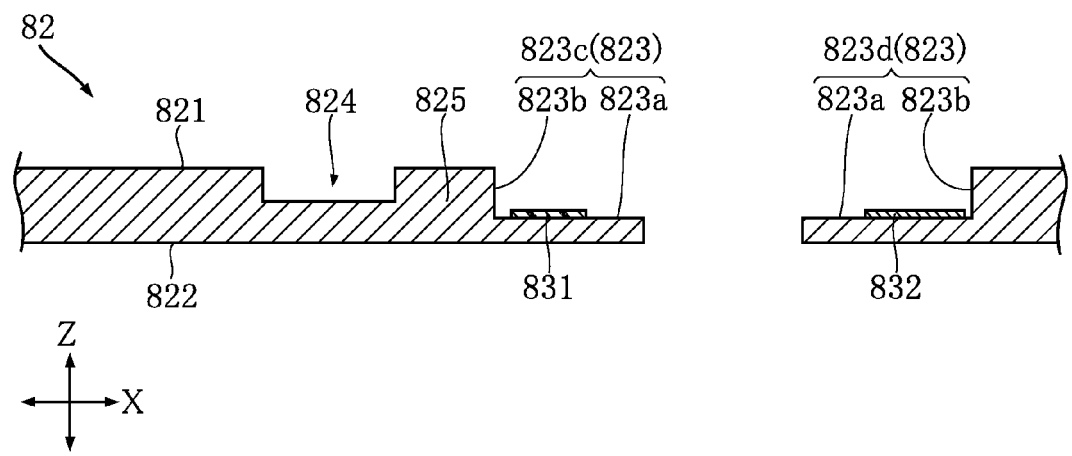
FIG. 11 is a sectional view for describing a method for making the solid electrolytic capacitor shown in FIG. 1.

The capacitor element 81 is then placed to span the two regions (the first region 823c and the second region 823d) of the first recess 823. Specifically, as shown in FIG. 11, an electrically insulating adhesive 831 and an electrically conductive adhesive 832 are applied to the first recess 823. The electrically insulating adhesive 831 when hardened becomes the anode bonding layer 33 of the solid electrolytic capacitor A10, whereas the electrically conductive adhesive 832 when hardened becomes the cathode bonding layer 43 of the solid electrolytic capacitor A10. In this embodiment, the electrically insulating adhesive 831 is applied to the bottom surface 823a of the first region 823c, whereas the electrically conductive adhesive 832 is applied to the bottom surface 823a of the second region 823d. In this process, the electrically insulating adhesive 831 may be applied to the side surface 823b of the first region 823c, and the electrically conductive adhesive 832 may be applied to the side surface 823b of the second region 823d. In this embodiment, the electrically insulating adhesive 831 is polyimide, and the electrically conductive adhesive 832 is a synthetic resin mainly composed of an epoxy resin containing Ag.

Figure 12:
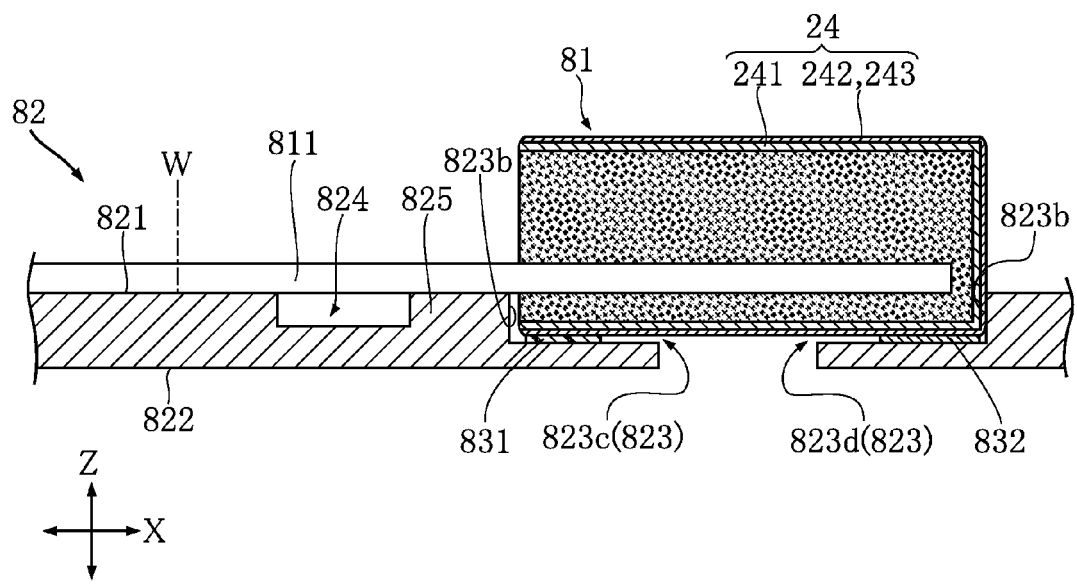
FIG. 12 is a sectional view for describing a method for making the solid electrolytic capacitor shown in FIG. 1.

As shown in FIG. 12, the cathode portion 24 is bonded to the electrically insulating adhesive 831 and the electrically conductive adhesive 832. Then, the anode wire 811 is fixed to the base member obverse surface 821. In this embodiment, the anode wire 811 is fixed to the base member obverse surface 821 by laser spot welding. In this process, the anode wire 811 is fixed to the base member obverse surface 821 at a position opposite to the first recess 823 (or the intermediate portion 825) with respect to the second recess 824. This fixing position or weld position is indicated in FIG. 12 with a single-dashed line W. In this embodiment, the anode wire 811, while fixed to the base member obverse surface 821, is in contact with the intermediate portion 825. However, the anode wire 811 may not be in contact with the intermediate portion 825 when fixed to the base member obverse surface 821. After the anode wire 811 is fixed to the base member obverse surface 821, the electrically insulating adhesive 831 and the electrically conductive adhesive 832 are hardened in a curing furnace.

Figure 13:
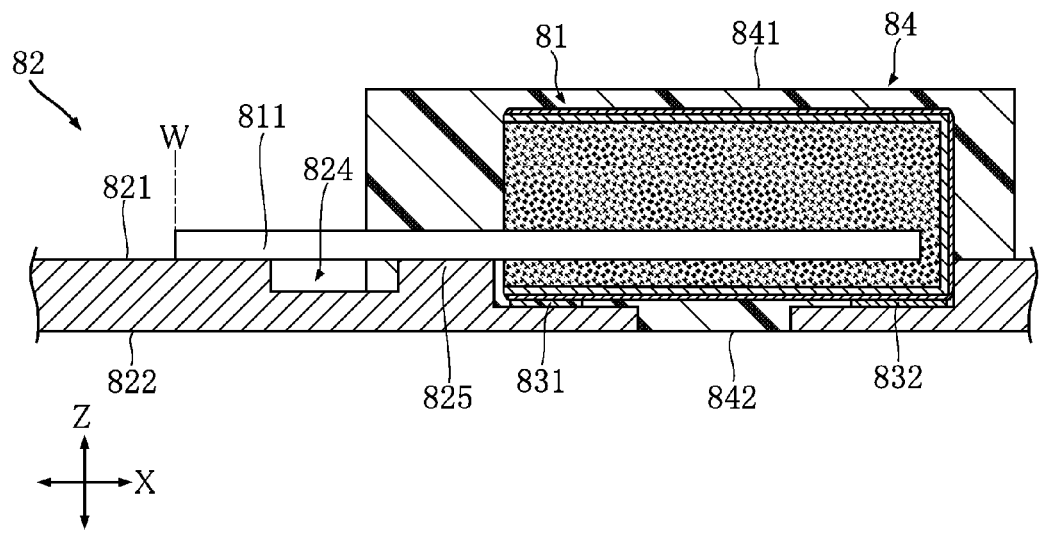
FIG. 13 is a sectional view for describing a method for making the solid electrolytic capacitor shown in FIG. 1.

As shown in FIG. 13, the anode wire 811, connected to the support member 88, is cut at the weld position W, and a sealing resin 84 is formed on the electrically conductive base member 82 to cover the capacitor element 81. The sealing resin 84 corresponds to the sealing resin 5 of the solid electrolytic capacitor A10. The sealing resin 84 of this embodiment is produced by transfer molding in which a liquefied epoxy resin containing glass frit is heat-cured. The sealing resin 84 is formed to completely fill the first recess 823 and completely cover the intermediate portion 825. In this process, the resin obverse surface 841 and the resin reverse surface 842 that face away from each other in the thickness direction Z of the capacitor element 81 are formed. The resin reverse surface 842 is the lower surface of the sealing resin 84 shown in FIG. 13, and the base member reverse surface 822 is exposed at the resin reverse surface 842.

Figure 14:
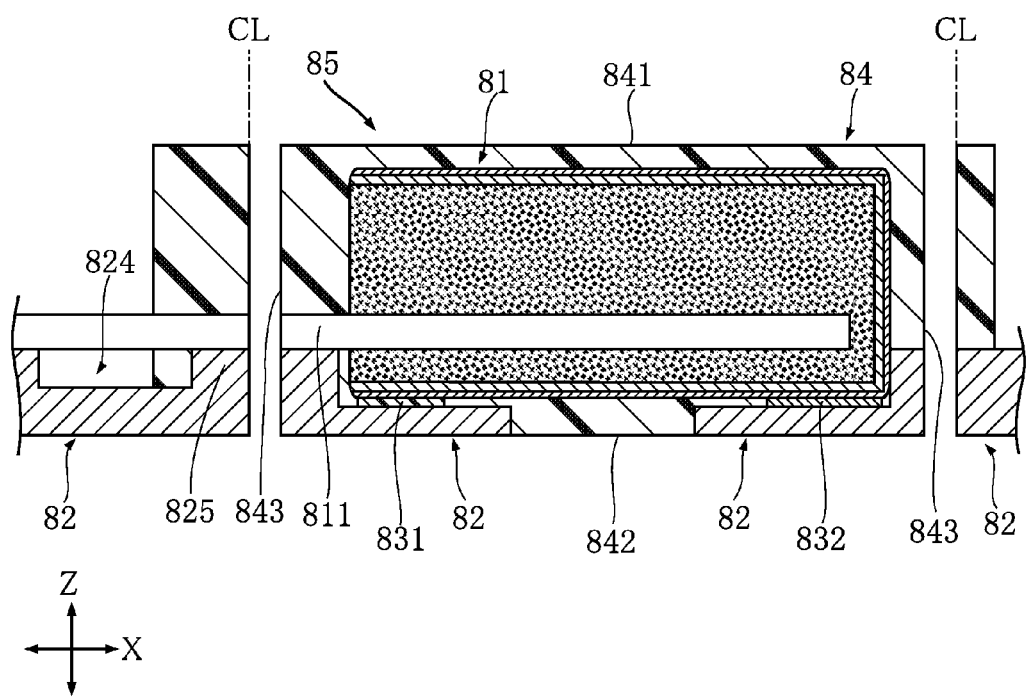
FIG. 14 is a sectional view for describing a method for making the solid electrolytic capacitor shown in FIG. 1.

Next, as shown in FIG. 14, for the electrically conductive base member 82, cutting is performed at a portion (intermediate portion 825) between the first recess 823 and the second recess 824 and at a portion that is opposite to the portion including the second recess 824 with respect to the first recess 823, along respective cutting lines C. By the cutting, the electrically conductive base member 82 is divided into a piece 85 containing a single capacitor element 81. The piece 85 is one formation unit of the solid electrolytic capacitor A10. The cutting is performed by plasma dicing, for example. In this process, a pair of resin side surfaces 843 are formed that are perpendicular to both of the resin obverse surface 841 and the resin reverse surface 842 and spaced apart from each other in the first direction X. A part of the electrically conductive base member 82 is exposed at each of the paired resin side surfaces 843.

Figure 15:
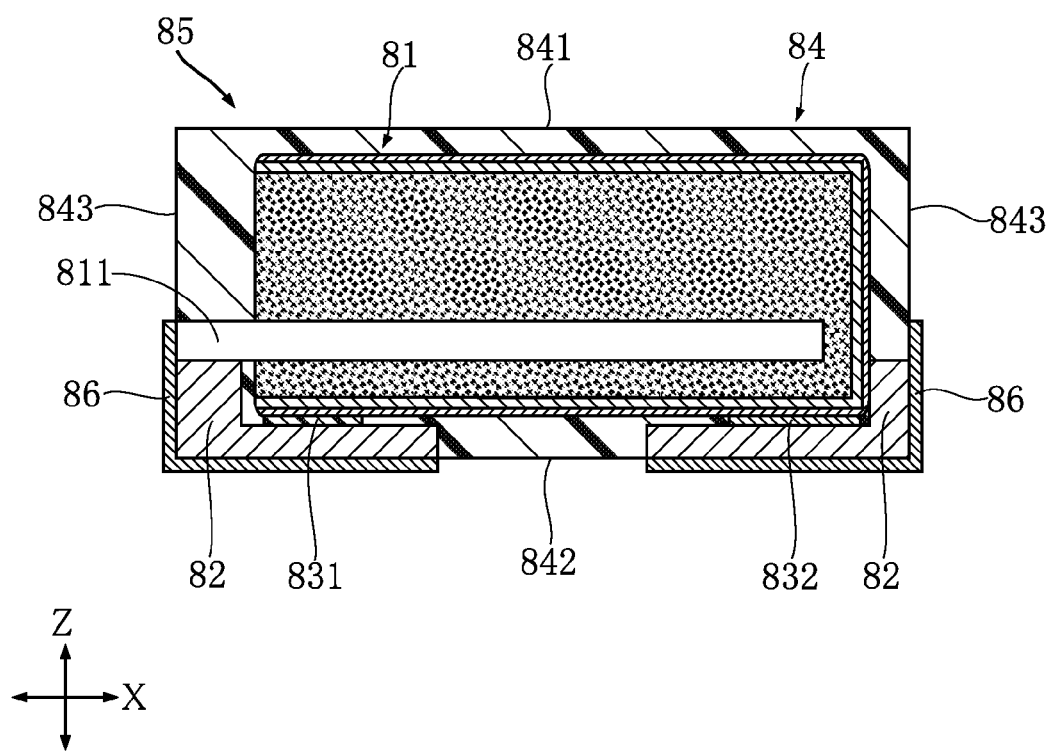
FIG. 15 is a sectional view for describing a method for making the solid electrolytic capacitor shown in FIG. 1.

In the last step, as shown in FIG. 15, electrically conductive covering members 86 are formed to come into contact with portions of the electrically conductive base member 82 and anode wire 811 that are exposed from the sealing resin 84 of the piece 85. The electrically conductive covering members 86 correspond to the anode terminal covering layer 61 and the cathode terminal covering layer 62 of the solid electrolytic capacitor A10. In this embodiment, the electrically conductive covering member 86 is formed by sputtering and electroplating. Specifically, to form the electrically conductive covering member 86, a Ni layer is formed by sputtering to cover the portions of the electrically conductive base member 82 and anode wire 811 that are exposed from the sealing resin 84, and then an alloy layer containing Sn is formed by electroplating to cover the Ni layer. In this process, a part of the resin reverse surface 842 and a part of the paired resin side surfaces 843 are covered by the electrically conductive covering member 86. The solid electrolytic capacitor A10 is obtained through the above process.

Advantages of the solid electrolytic capacitor A10 are described below.

As described above, the solid electrolytic capacitor A10 has the anode terminal 3 including the anode support portion 31 supporting the capacitor element B and the anode standing portion 32 which stands on the anode support portion 31 in the thickness direction Z and on which the anode wire 22 is disposed. The solid electrolytic capacitor A10 also has the electrically conductive anode terminal covering layer 61 that is in contact with portions of the anode wire 22 and anode standing portion 32 that are exposed from the sealing resin 5. Unlike the above-described conventional arrangement, the anode wire 22 and the anode standing portion 32 in this arrangement are electrically connected to each other via the anode terminal covering layer 61 without welding the anode wire 22 to the anode standing portion 32. With this arrangement, an increase in leakage current of the capacitor element B due to thermal effect involved in welding the anode wire 22 is avoided. The length of the anode wire 22 can be made as short as possible within a range in which the cathode portion 24 of the capacitor element B does not come into contact with the anode standing portion 32, so that size reduction of the solid electrolytic capacitor A10 is achieved. Thus, the solid electrolytic capacitor A10 realizes size reduction while suppressing an increase in leakage current of the capacitor element B.

In making the solid electrolytic capacitor A10, the anode wire 811 is welded to the weld position W in the base member obverse surface 821 of the electrically conductive base member 82. The weld position W is positioned opposite to the intermediate portion 825, a part of which is to become the anode standing portion 32, with respect to the second recess 824. In this welding process, unlike the conventional arrangement, a sufficiently long distance is secured between the weld position W and the cathode portion 24, so that the portion of the anode wire 811 that is inserted in the porous sintered body 21 is hardly affected by the heat generated in welding. Bonding the anode wire 811 in this way realizes size reduction of the solid electrolytic capacitor A10 while avoiding an increase in leakage current of the capacitor element B.

The capacitor element B is supported by both of the anode support portion 31 and the cathode support portion 41. In making the solid electrolytic capacitor A10, the capacitor element 81 is disposed in the first recess 823 of the electrically conductive base member 82 stably without inclination with respect to the first direction X. This prevents an excessively large mechanical load from acting on the anode wire 811, which has a relatively low strength.

As described above, the cathode terminal 4 includes the cathode support portion 41 supporting the capacitor element B and the cathode standing portion 42 standing on the cathode support portion 41 in the thickness direction Z. In making the solid electrolytic capacitor A10, the presence of the cathode standing portion 42 prevents the capacitor element 81 from being arranged at an improper position deviated in the first direction X. In mounting the solid electrolytic capacitor A10 onto a circuit board, the cathode standing portion 42 promotes formation of a solder fillet, which makes solder bonding more reliable.

The anode wire 22 is offset from the center of the porous sintered body 21 toward the anode supporting portion 31 and the cathode supporting portion 41, or toward the element bottom surface 12 in the thickness direction Z. This arrangement allows the anode standing portion 32 to have a relatively low height.

Thus, the solid electrolytic capacitor A10 can be made using a relatively thin conductive base material 82 and hence with a relatively small amount of work such as press working or etching. This enhances the manufacturing efficiency of the solid electrolytic capacitor A10.

As described above, both of the anode terminal covering layer 61 and the cathode terminal covering layer 62 may be made of laminated layers such as a Ni layer and an alloy layer containing Sn. The anode terminal covering layer 61 covers the entire portion of the anode terminal 3 that is exposed from the sealing resin 5, and the cathode terminal covering layer 62 covers the entire portion of the cathode terminal 4 that is exposed from the sealing resin 5. Thus, in mounting the solid electrolytic capacitor A10 onto a circuit board, the anode terminal covering layer 61 and the cathode terminal covering layer 62 protect the anode terminal 3 and the cathode terminal 4 from thermal shock.

If a crack is formed in the sealing resin 5 and the crack extends to the inside of the cathode portion 24 of the capacitor element B, the ESR (Equivalent Series Resistance) of the solid electrolytic capacitor A10 may increase. Using an epoxy resin containing glass frit as the material for the sealing resin 5 enhances the strength of the sealing resin 5 and prevents formation of a crack in the sealing resin 5.

The capacitors and methods of the present disclosure are not limited to the foregoing embodiments. Various design modifications can be made to the specific configurations of each part of the examples described above.

The invention claimed is:

1. A solid electrolytic capacitor comprising:
   a capacitor element including a porous sintered body made of a valve metal, an anode wire partially inserted in the porous sintered body, a dielectric layer covering the porous sintered body, and a cathode portion covering the dielectric layer;
   an anode terminal including an anode support portion supporting the capacitor element, and an anode standing portion standing on the anode support portion in a thickness direction of the capacitor element, the anode wire being disposed on the anode standing portion;
   a cathode terminal including a cathode support portion supporting the capacitor element;
   a sealing resin covering the capacitor element; and
   an electrically conductive anode terminal covering layer,
   wherein the anode terminal and the cathode terminal are made from a single electrically conductive base member,
   each of the anode wire, the anode support portion, the anode standing portion and the cathode support portion comprises an exposed part exposed from the sealing resin, and
   the anode terminal covering layer is in direct contact with the exposed part of the anode wire and the exposed part of the anode standing portion.

2. The solid electrolytic capacitor according to claim 1, wherein the anode wire and the anode standing portion are electrically connected to each other via the anode terminal covering layer.

3. The solid electrolytic capacitor according to claim 1, wherein the anode terminal covering layer is in contact with the exposed part of the anode support portion.

4. The solid electrolytic capacitor according to claim 3, further comprising an electrically conductive cathode terminal covering layer formed in contact with the exposed part of the cathode support portion.

5. The solid electrolytic capacitor according to claim 4, wherein the anode terminal covering layer and the cathode terminal covering layer are made of a same metal.

6. The solid electrolytic capacitor according to claim 5, wherein each of the anode terminal covering layer and the cathode terminal covering layer is made of laminated layers that include a Ni layer and an alloy layer containing Sn.

7. The solid electrolytic capacitor according to claim 1, wherein the cathode terminal comprises a cathode standing portion standing on the cathode support portion in the thickness direction of the capacitor element, and the cathode standing portion comprises an exposed part exposed from the sealing resin.

8. The solid electrolytic capacitor according to claim 7, wherein the cathode terminal covering layer is in contact with the exposed part of the cathode standing portion.

9. The solid electrolytic capacitor according to claim 1, wherein the electrically conductive base member is made of an alloy containing both Fe and Ni, or an alloy containing Cu.

10. The solid electrolytic capacitor according to claim 1, wherein the porous sintered body is in a form of a rectangular parallelepiped.

11. The solid electrolytic capacitor according to claim 10, wherein the anode wire is offset from a center of the porous sintered body toward the anode support portion and the cathode support portion in the thickness direction of the capacitor element.

12. The solid electrolytic capacitor according to claim 1, wherein the sealing resin includes a resin obverse surface and a resin reverse surface that face away from each other in the thickness direction of the capacitor element, and the resin reverse surface is flush with the exposed part of the anode support portion and the exposed part of the cathode support portion.

13. The solid electrolytic capacitor according to claim 12, wherein the sealing resin includes a pair of resin first side surfaces crossing the resin obverse surface and spaced apart from each other in a direction in which the anode wire extends, and one of the resin first side surfaces is flush with the exposed part of the anode wire and the exposed part of the anode standing portion.

14. The solid electrolytic capacitor according to claim 13, wherein the anode terminal covering layer covers a part of the one of the resin first side surfaces.

15. The solid electrolytic capacitor according to claim 1, further comprising an electrically conductive cathode bonding layer held in contact with the cathode support portion and the cathode portion.

16. The solid electrolytic capacitor according to claim 15, wherein the cathode bonding layer contains Ag.

17. The solid electrolytic capacitor according to claim 15, further comprising an electrically insulating anode bonding layer held in contact with the anode support portion and the cathode portion.

18. The solid electrolytic capacitor according to claim 17, wherein the anode bonding layer is made of polyimide.

19. The solid electrolytic capacitor according to claim 1, wherein the valve metal is Ta or Nb.

20. The solid electrolytic capacitor according to claim 19, wherein the anode wire and the porous sintered body are made of a same metal.

21. The solid electrolytic capacitor according to claim 1, wherein the cathode portion includes a solid electrolyte layer covering the dielectric layer, a first cathode layer covering the solid electrolyte layer, and a second cathode layer covering the first cathode layer and made of Ag.

22. The solid electrolytic capacitor according to claim 1, wherein the sealing resin is made of an epoxy resin containing glass frit.

23. A method for making a solid electrolytic capacitor, the method comprising:

forming a first recess and a second recess in a base member obverse surface of an electrically conductive base member;

dividing the first recess into a first region and a second region by removing a part of the base member;

placing a capacitor element to span the first region and the second region, the capacitor element comprising a porous sintered body made of a valve metal, an anode wire partially inserted in the porous sintered body, a dielectric layer covering the porous sintered body, and a cathode portion covering the dielectric layer;

forming a sealing resin covering the capacitor element;

cutting the base member along a first line and a second line that flank the porous sintered body to obtain a piece of the base member, the first line being disposed between the first recess and the second recess; and forming an electrically conductive covering member held in direct contact with an exposed part of the piece of the base member and with an exposed part of the anode wire, wherein the placing of the capacitor element comprises fixing the anode wire to a part of the base member obverse surface that is opposite to the first recess with respect to the second recess.

24. The method according to claim 23, wherein the first recess and the second recess are formed by press working or etching.

25. The method according to claim 23, wherein the anode wire is fixed to the part of the base member obverse surface by laser spot welding.

26. The method according to claim 23, wherein the placing of the capacitor element comprises: applying an electrically conductive adhesive and an electrically insulating adhesive to the first region and the second region, respectively; and bringing the cathode portion into contact with the electrically conductive adhesive and the electrically insulating adhesive.

27. The method according to claim 23, wherein the electrically conductive covering member is formed by sputtering and electroplating.

28. A solid electrolytic capacitor, comprising:
a capacitor element including a porous sintered body made of a valve metal, an anode wire partially inserted in the porous sintered body, a dielectric layer covering the porous sintered body, and a cathode portion covering the dielectric layer;
an anode terminal including an anode support portion supporting the capacitor element, and an anode standing portion standing on the anode support portion in a thickness direction of the capacitor element, the anode wire being disposed on the anode standing portion;
a cathode terminal including a cathode support portion supporting the capacitor element;
a sealing resin covering the capacitor element; and
an electrically conductive anode terminal covering layer,
wherein the anode terminal and the cathode terminal are made from a single electrically conductive base member,
each of the anode wire, the anode support portion, the anode standing portion and the cathode support portion comprises an exposed part exposed from the sealing resin, and
the anode terminal covering layer is in contact with the exposed parts of the anode wire and the anode standing portion,
wherein the sealing resin includes a resin obverse surface and a resin reverse surface that face away from each other in the thickness direction of the capacitor element, and the resin reverse surface is flush with the exposed part of the anode support portion and the exposed part of the cathode support portion.

* * * * *